June 3, 1924.
J. BATH
ADJUSTABLE GAUGE
Filed Sept. 19, 1919
1,496,199
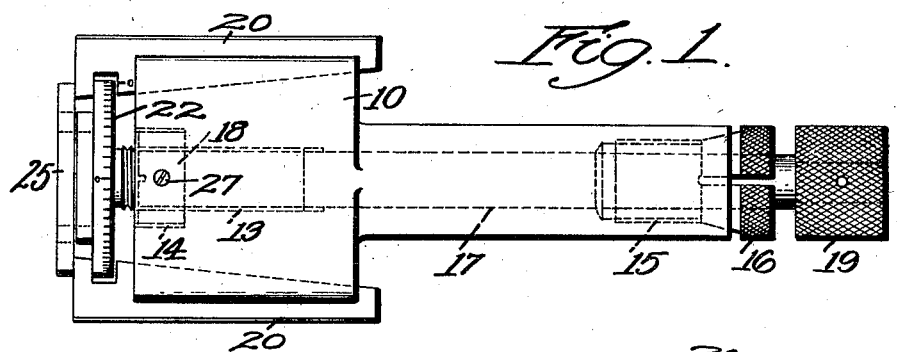
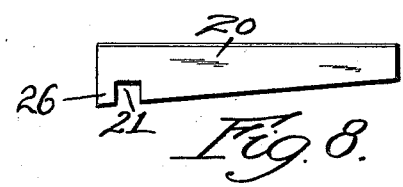
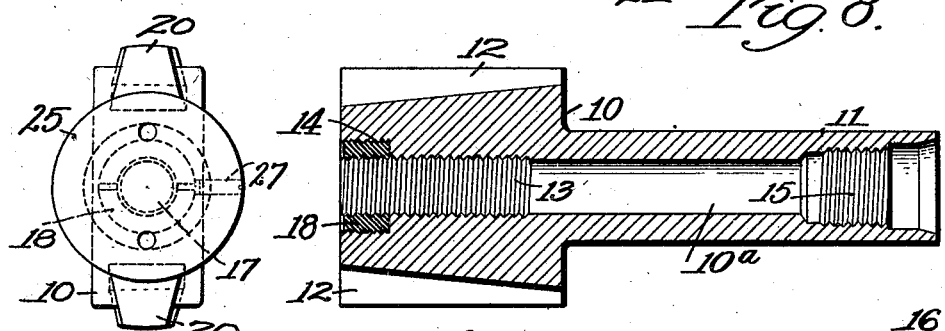
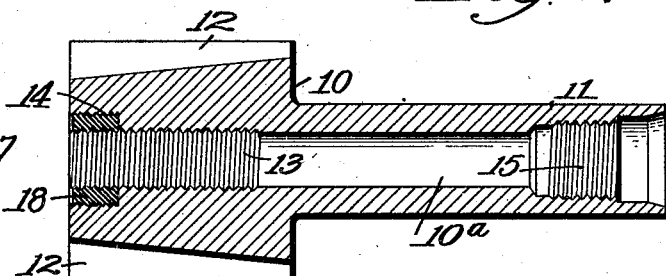
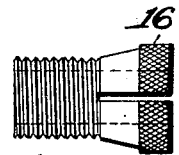
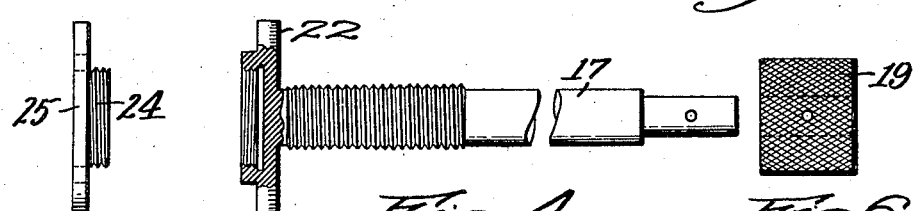
Inventor
John Bath.
By attorneys
Southgate & Southgate
Witness

Patented June 3, 1924.

1,496,199

UNITED STATES PATENT OFFICE.

JOHN BATH, OF WORCESTER, MASSACHUSETTS, ASSIGNOR TO JOHN BATH & CO. INC., OF WORCESTER, MASSACHUSETTS, A CORPORATION OF MASSACHUSETTS.

ADJUSTABLE GAUGE.

Application filed September 19, 1919. Serial No. 324,883.

*To all whom it may concern:*

Be it known that I, JOHN BATH, a citizen of the United States, residing at Worcester, in the county of Worcester and State of Massachusetts, have invented a new and useful Adjustable Gauge, of which the following is a specification.

This invention relates to an adjustable gauge for measuring or comparing the internal diameters of circular holes and recesses.

It is the general object of my invention to provide a gauge of this type, which may be simply and accurately constructed and which will be convenient in operation, and productive of extremely accurate measurements.

In the preferred form my improved gauge comprises a body having inclined guide-ways formed therein, tapered gauge-bars slidable in said guide-ways, means to move said bars axially, and means to accurately indicate the change in diameter resulting from such movement.

Important features of my invention relate to the connection between the operating rod or screw and the gauge-bars, to provision for preventing lost motion in this connection, to means for taking up wear or lost motion between the operating rod and the gauge body, and to means for locking the gauge in adjusted position.

My invention further relates to arrangements and combinations of parts which will be hereinafter described and more particularly pointed out in the appended claims.

A preferred form of my invention is shown in the drawings in which,

Fig. 1 is a side elevation of my improved gauge;

Fig. 2 is an end view thereof, and

Figs. 3 to 8 are side views, partly in section, of different parts of the gauge.

Referring to the drawings, my improved gauge comprises a body 10 having an extension 11 forming a handle for the gauge. The body 10 is provided with two or more guide-ways 12 preferably dove-tailed in section, as shown in Fig. 2, and inclined axially as shown in Fig. 3.

The body 10 is also provided with a hole 10$^a$ extending through the center thereof, and threaded at 13, 14 and 15 in three different diameters, the threaded portion 14 being provided with a left-hand thread. The handle end of the hole 10$^a$ is countersunk to provide a conical seat for a clamping screw 16, (see Fig. 7). An operating rod 17 extends through the hole 10$^a$ in the body 10 and is threaded to fit the threaded portion 13 of the body.

A collar 18 is threaded to fit in the threaded portion 14 of the body 10, and is internally threaded to fit the threads of the rod 17. The collar 18 is provided with a screw-driver slot and may be turned slightly in one direction or the other to take up wear or back-lash between the rod 17 and the threaded portion 13.

A knurled collar 19 is fixed to the handle end of the rod 17 after the parts are assembled.

A plurality of tapered gauge bars 20 are provided, said bars being shaped to fit the guide-ways 12, and being also provided with notches 21 near their outer ends. The rod 17 is provided with a disc 22 extending into the notches 21 of the gauge bars 20, and engaging the outer side face of each notch.

The disc 22 is provided with a flange on its outer surface threaded internally to receive a plug 24 formed on the inner surface of a second disc 25 having holes for a spanner wrench. When the plug 24 is screwed firmly into the end of the disc 22, the discs 22 and 25 closely engage the projection 26 between the end of each gauge bar 20 and its notch 21, and prevent any lost motion between the rod 17 and the bars 20. As the rod 17 is turned by the collar 19, the bars 20 are moved in one direction or the other by engagement of the discs 22 and 25 with the bars as above described.

When it is desired to preserve a gauge setting, the hollow screw 16 may be turned into the end of the handle portion 11, thus clamping the split end of the screw upon the rod 17. A screw 27 threaded into the body 10 may be used to preserve the setting of the adjusting nut 18.

The outer edge of the disc 22 is preferably provided with graduations by which the change in diameter may be read directly in thousandths and tenths of thousandths of an inch, by reference to a zero mark on the body 10, or to an edge of a gauge bar 20.

I have found that a gauge constructed as herein described may be read with extreme accuracy. By using an angle of approximately five degrees for the gauge bars, and by using twenty threads per inch for the threaded portion 13, one revolution of the disc 22 will increase the outside diameter of the gauge bars one one-hundredths of an inch, and one ten-thousandths of an inch will be represented by a space of about one twenty-fifth of an inch around the periphery of a disc 22 having a diameter of an inch and a quarter. Readings can thus be made with the greatest accuracy directly from the divisions on the disc 22.

Having thus described my invention, it will be evident that changes and modifications can be made therein by those skilled in the art, within the scope of my invention as set forth in the claims, and I do not wish to be otherwise limited to the details herein disclosed, but what I claim is:—

1. An adjustable gauge comprising a body having an axis, guideways oppositely inclined with respect to said axis, notched gauge bars slidably mounted in said guideways, and a rod threaded in said body, a disc fixed thereon and rotatable therewith, said disc engaging said bars in the notches thereof to move the same longitudinally of said guideways and radially with respect to said axis as said disc is simultaneously rotated and moved lengthwise in said body by rotation of said threaded rod.

2. An adjustable gauge comprising a body having an axis, guideways oppositely inclined with respect to said axis, tapered gauge bars slidably mounted in said guideways, a rod threaded in said body, and means on said rod engaging said bars to move the same longitudinally of said guideways and radially with respect to said axis, the threaded portion of said body comprising two parts and one of said parts being mounted for relative angular and axial adjustment in said body and being thereby effective to prevent lost motion between said rod and body.

3. An adjustable gauge comprising a body having an axis, guideways oppositely inclined with respect to said axis, notched gauge bars slidably mounted in said guideways, a rod threaded in said body and having a disc thereon engaging said bars in the notches thereof to move the same longitudinally of said guideways and radially with respect to said axis, and means mounted on said rod and engaging the ends of said bars to prevent lost motion between said disc and said bars.

4. An adjustable gauge comprising a body having an axis, guideways oppositely inclined with respect to said axis, tapered gauge bars slidably mounted in said guideways and each having a notch near its outer end, a rod extending through said body and threaded therein, said rod having a disc at one end engaging said bars in the notches thereof and rendering said rod effective to move said bars longitudinally of said guideways and radially in respect to said axis, and a second disc secured to said rod and engaging the outer ends of said gauge bars to prevent lost motion between said bars and said rod.

In testimony whereof I have hereunto affixed my signature.

JOHN BATH.